(12) United States Patent
Jain (10) Patent No.: US 8,483,179 B2
(45) Date of Patent: Jul. 9, 2013

(54) ATTACHMENT INDICATOR FOR HANDOVER BETWEEN HETEROGENOUS NETWORKS

(75) Inventor: Puneet K. Jain, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 359 days.

(21) Appl. No.: 12/853,568

(22) Filed: Aug. 10, 2010

(65) Prior Publication Data

US 2011/0044286 A1 Feb. 24, 2011

Related U.S. Application Data (60) Provisional application No. 61/275,266, filed on Aug. 24, 2009.

(51) Int. Cl.
*H04Q 7/00* (2006.01)

(52) U.S. Cl.
USPC .......................................................... 370/331

(58) Field of Classification Search
None
See application file for complete search history.

(56) References Cited

U.S. PATENT DOCUMENTS

| 7,756,609 | B2  | 7/2010  | Jurkat et al. |         |
|-----------|-----|---------|---------------|---------|
| 7,990,925 | B2* | 8/2011  | Tinnakornsrisuphap et al. | 370/331 |
| 8,086,235 | B2* | 12/2011 | Touray et al. | 455/436 |
| 8,224,330 | B2* | 7/2012  | Ahmed         | 455/436 |
| 8,325,679 | B2  | 12/2012 | Taaghol et al. |        |
| 2004/0219948 | A1 | 11/2004 | Jones et al. |          |
| 2005/0048972 | A1 | 3/2005  | Dorenbosch et al. |      |
| 2006/0034195 | A1* | 2/2006 | Blaiotta et al. | 370/261 |
| 2006/0140150 | A1 | 6/2006 | Olvera-Hernandez et al. | |
| 2007/0076649 | A1 | 4/2007 | Lin et al. |             |
| 2007/0100981 | A1* | 5/2007 | Adamczyk et al. | 709/223 |
| 2007/0223516 | A1 | 9/2007 | Dunn et al. |            |
| 2008/0101291 | A1 | 5/2008 | Jiang et al. |           |
| 2008/0102843 | A1 | 5/2008 | Todd et al. |            |
| 2008/0107084 | A1* | 5/2008 | Pichna et al. | 370/332 |
| 2008/0178266 | A1* | 7/2008 | Touray et al. | 726/4   |
| 2009/0016302 | A1* | 1/2009 | Shaheen       | 370/331 |
| 2009/0017826 | A1 | 1/2009 | Shaheen |                |
| 2009/0046682 | A1 | 2/2009 | Kim et al. |             |
| 2009/0133102 | A1* | 5/2009 | Wen et al. | 726/4       |

(Continued)

FOREIGN PATENT DOCUMENTS

| KR | 10-0785303 B1 | 12/2007 |
| WO | 2010/138264 A2 | 12/2010 |
| WO | 2010/138264 A3 | 2/2011 |
| WO | 2011/109189 A2 | 9/2011 |

OTHER PUBLICATIONS

International Search Report and Written Opinion received for International Patent Application No. PCT/US2011/025727, mailed on Oct. 27, 2011, 3 pages.

(Continued)

*Primary Examiner* — Hassan Phillips
*Assistant Examiner* — Prenell Jones
(74) *Attorney, Agent, or Firm* — Caven & Aghevli LLC (57) ABSTRACT

In some embodiments a method comprises receiving, in a WiMAX Signaling forwarding function (SFF) node, a preregistration request for a mobile station, in response to the preregistration request, generating a flag to indicate whether the request is being processed by the WiMAX Signaling forwarding function node, and forwarding a preattachment request from the WiMAX Signaling forwarding function node to an access gateway, wherein the preattachment request comprises the flag. Other embodiments may be described.

17 Claims, 6 Drawing Sheets

U.S. PATENT DOCUMENTS

| | | |
|---|---|---|
| 2009/0168676 A1 | 7/2009 | Olson |
| 2009/0170512 A1* | 7/2009 | Regnier et al. ............ 455/435.1 |
| 2009/0207808 A1* | 8/2009 | McCann et al. ............ 370/331 |
| 2009/0207812 A1 | 8/2009 | Gupta et al. |
| 2009/0279502 A1 | 11/2009 | Zheng et al. |
| 2009/0285176 A1 | 11/2009 | Zheng et al. |
| 2009/0290556 A1 | 11/2009 | Taaghol |
| 2009/0323636 A1* | 12/2009 | Dillon et al. ............... 370/331 |
| 2010/0046477 A1* | 2/2010 | Marin et al. ................ 370/332 |
| 2010/0135248 A1* | 6/2010 | Aramaki et al. ............ 370/331 |
| 2010/0138661 A1* | 6/2010 | Tsai et al. .................... 713/171 |
| 2010/0278091 A1* | 11/2010 | Sung et al. .................. 370/312 |
| 2010/0290352 A1 | 11/2010 | Oyman et al. |
| 2010/0304737 A1 | 12/2010 | Jain et al. |
| 2010/0323700 A1* | 12/2010 | Bachmann et al. ........... 455/436 |
| 2010/0325714 A1* | 12/2010 | Iyer et al. ........................... 726/8 |
| 2011/0003595 A1* | 1/2011 | Shan ............................ 455/436 |
| 2011/0047289 A1 | 2/2011 | Venkatachalam et al. |
| 2011/0058531 A1 | 3/2011 | Jain et al. |
| 2011/0058556 A1* | 3/2011 | He ................................ 370/392 |
| 2011/0063997 A1* | 3/2011 | Gras et al. ................... 370/254 |
| 2011/0149926 A1* | 6/2011 | Li et al. ........................ 370/338 |
| 2011/0158161 A1 | 6/2011 | Jain |
| 2011/0216744 A1 | 9/2011 | Taaghol et al. |
| 2011/0255459 A1 | 10/2011 | Gupta et al. |
| 2011/0261787 A1 | 10/2011 | Bachmann et al. |
| 2012/0093086 A1* | 4/2012 | Yin et al. ..................... 370/328 |

OTHER PUBLICATIONS

Notice of Allowance Received for U.S. Appl. No. 12/718,107, mailed on Aug. 2, 2012, 7 pages.

Office Action received for U.S. Appl. No. 12/472,125, mailed on Mar. 9, 2012, 14 pages.

Office Action received for U.S. Appl. No. 12/472,125, mailed on Oct. 16, 2012, 12 pages.

Office Action Received for U.S. Appl. No. 12/472,125, mailed on Sep. 30, 2011, 14 pages.

Office Action Received for U.S. Appl. No. 12/718,107, mailed on Dec. 12, 2011, 11 pages.

* cited by examiner

ATTACHMENT INDICATOR FOR HANDOVER BETWEEN HETEROGENOUS NETWORKS

RELATED APPLICATIONS

This application claims the right of priority under 35 U.S.C. §119(e) from U.S. provisional patent application No. 61/275,266, filed Aug. 24, 2009, the disclosure of which is incorporated herein by reference in its entirety.

BACKGROUND

Mobile services providers may operate multiple heterogeneous access technologies and networks. Worldwide Interoperability for Microwave Access (WiMAX) is a wireless communication access technology intended to be deployed in accordance with the Institute of Electrical and Electronics Engineers (IEEE) standard referred to as IEEE 802.16. WiMAX networks provide broadband wireless communication over distances which are relatively long. Initial WiMAX deployment may cover only limited areas of service that may already be serviced by the third generation (3G) type cellular networks, such as promulgated by the 3rd Generation Partnership Project (3GPP). Thus, at least during initial deployment of WiMAX networks, islands of WiMAX coverage areas may exist within cellular 3G coverage areas. Hence, it may be useful for a 3G network service provider that deploys WiMAX services to converge WiMAX access and 3G access with seamless vertical mobility, or interaccess. Furthermore, dual mode devices that are capable of communicating with both 3G networks and WiMAX networks are expected to be deployed.

Current solutions for network interaccess in 3GPP standards and the cellular industry utilize Layer 3 (L3) protocols (i.e., client-based Mobile IP) for providing mobility between access technologies. However, such L3 protocol-based methods require simultaneous radio operation of both access technologies to execute a handover operation between a non-WiMAX network and a WiMAX network. Further, client-based Mobile IP techniques may experience significant latency in performing interaccess handovers that could hinder operation of real-time services such as Voice over Internet Protocol (VoIP) applications or the like.

Protocols have been developed in WiMAX to provide for single-radio handover between a WiMAX network and a non-WiMAX network. In single-radio handovers various network elements cooperate to manage the handover process between heterogeneous access networks.

BRIEF DESCRIPTION OF THE DRAWINGS

The detailed description is described with reference to the accompanying figures.

DETAILED DESCRIPTION

Described herein are exemplary methods and network nodes which provide an attachment indicator for handover between heterogeneous networks. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
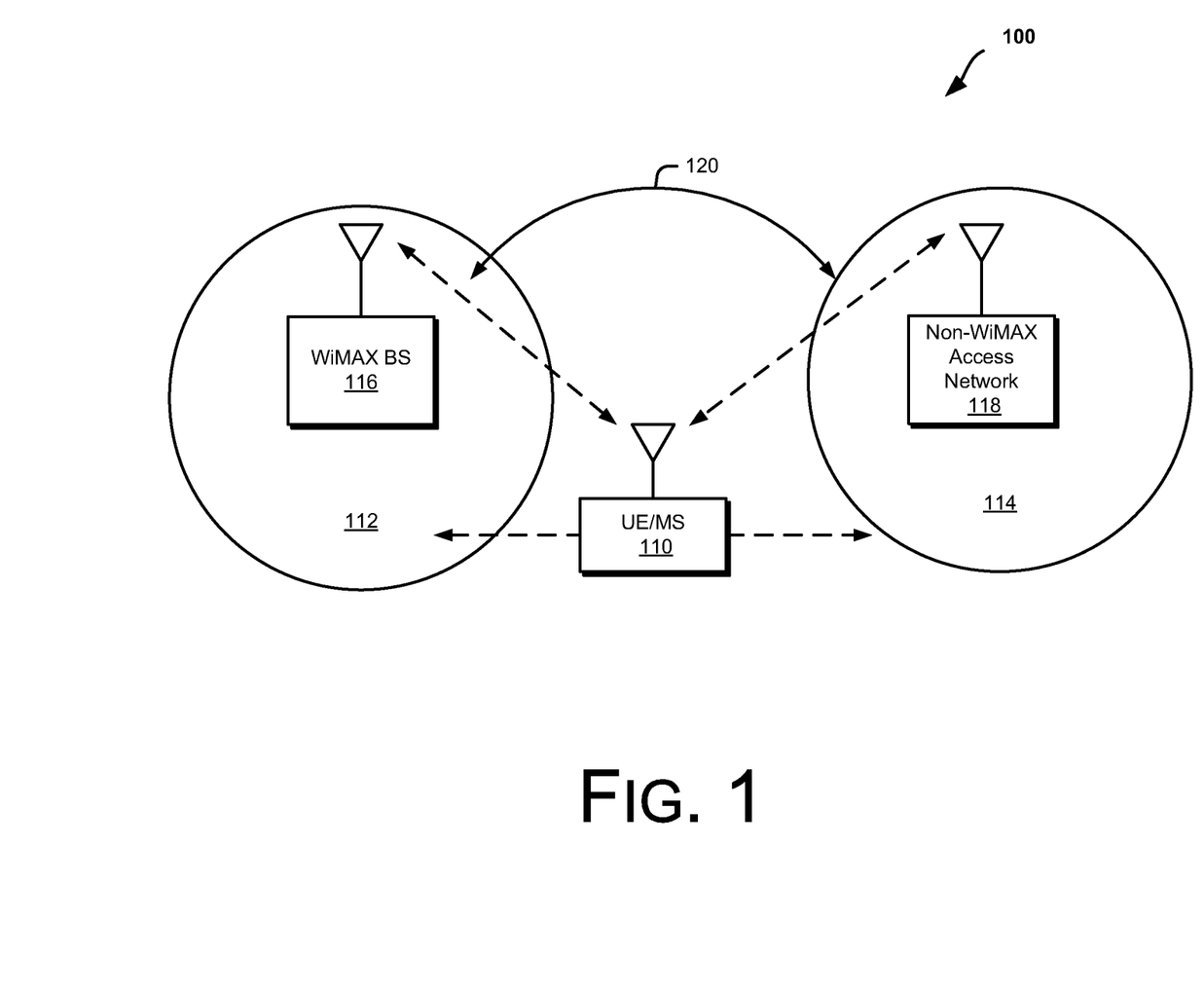
FIG. 1 is a schematic illustration of a handover between two or more heterogeneous wireless networks, according to some embodiments.

Referring now to FIG. 1, a block diagram of a wireless network illustrating a handover between two or more heterogeneous wireless networks in accordance with one or more embodiments will be discussed. As shown in FIG. 1, wireless network 100 may comprise a WiMAX access network coverage area 112 disposed in and/or proximate to a non-WiMAX access network coverage area 114. WiMAX access network coverage area 112 may be serviced by a WiMAX Base Station (WiMAX BS) 116, and likewise non-WiMAX access network coverage area 114 may be serviced by a non-WiMAX access network 118. Alternatively, for General Packet Radio Service (GPRS) access, non-WiMAX access network 118 may include or comprise a Serving GPRS Support Node (SGSN). Other types of #G type services may likewise be implemented, for example Universal Mobile Telecommunications System (UMTS), High-Speed Downlink Packet Access (HSDPA), High-Speed Uplink Packet Access (HSUPA), 3GPP Long Term Evolution (3GPP LTE), and so on, although the scope of the claimed subject matter is not limited in this respect.

In one or more embodiments, a user equipment/mobile station (UE/MS) 110 may move between WiMAX access network coverage area 112 and non-WiMAX access network coverage area 114. If mobile station 110 moves from WiMAX coverage area 112 to non-WiMAX access network coverage area 114, or if mobile station 110 movies from non-WiMAX access network coverage area 114 to WiMAX coverage area 112, a handover operation 120 may occur between the WiMAX access network to the non-WiMAX access network, or from the non-WiMAX access network to the WiMAX access network. In one or more embodiments, handover operation 120 may implement an optimized handover method between WiMAX and non-WiMAX services where the mobile station 110 may have one radio active at any given time. To enable single radio operation that a single radio module of a multi-communication platform is on at any given time, inter-radio access technology (inter-RAT) info exchange may be utilized. Example architectures of wireless networks capable of implementing a handover between access services is discussed with respect to FIGS. 2-3, below.

Figure 2:
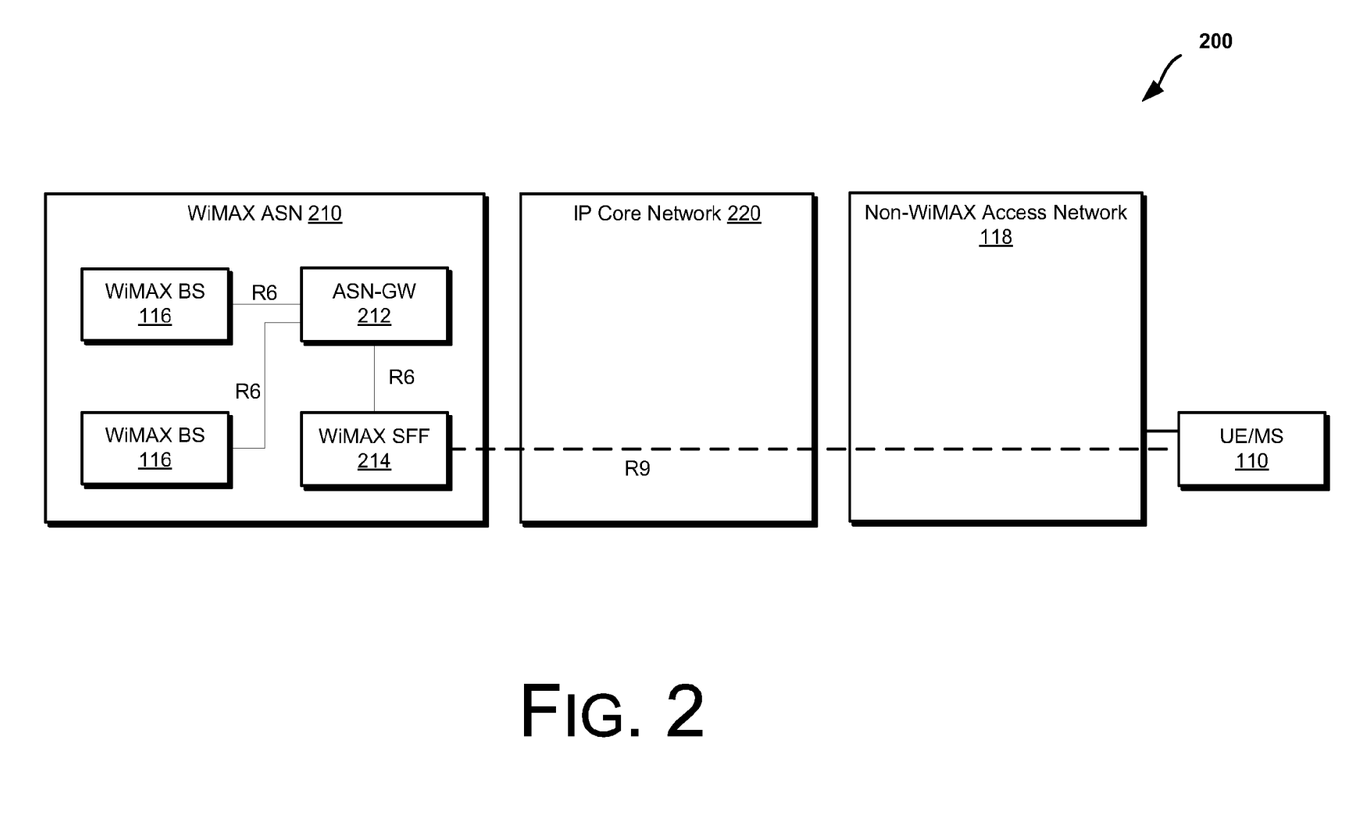
FIG. 2 is a schematic illustration of a network reference model for single radio interworking of a mobile WiMAX system with non-WiMAX access networks, according to embodiments.

FIG. 2 is a schematic illustration of a network reference model for single radio interworking of a mobile WiMAX system with non-WiMAX access networks, according to embodiments. Referring to FIG. 2, a WiMAX access Access Service Network (ASN) 210 comprises one or more WiMAX base stations 116 coupled to an Access Service Network Gateway (ASN-GW) 212 over an R6 interface. The ASN-GW 212 provides connectivity and various services, including handover management, to devices using the WiMAX access network. A WiMAX Signaling forwarding function (SFF) 214 is also coupled to the ASN-GW 212 via an R6 interface. The WiMAX SFF 214 is a functional element which supports layer 3 tunneling.

In brief, a UE/MS 110 communicates with the WiMAX SFF 214 via a non-WiMAX access network 118 and the IP Core network 220. By way of example, the Non-WiMAX access network 118 may be a 3GPP access network, a 3GPP2 access network, a WiFi network, or the like. The WiMAX SFF 214 functions as a preregistration node to facilitate preregistration and authentication of the UE/MS 110 with the WiMAX access network 118 while the UE/MS 110 is coupled to the non-WiMAX access network 118. In some embodiments the WiMAX SFF 214 uses a private IP address to allow the UE/MS 110 to communicate securely with the WiMAX SFF 214. One skilled in the art will recognize that, as a functional element, the WiMAX SFF 214 may be integrated into, collocated with, or completely separate from the ASN-GW 212, or a WiMAX base station 116. WiMAX Signaling Forwarding Function (SFF) may also be referred as WiMAX Signal Forwarding Function, WiMAX Single Radio Server (SRS), WiMAX Forward Attachment Function (FAF) etc.

Figure 3:
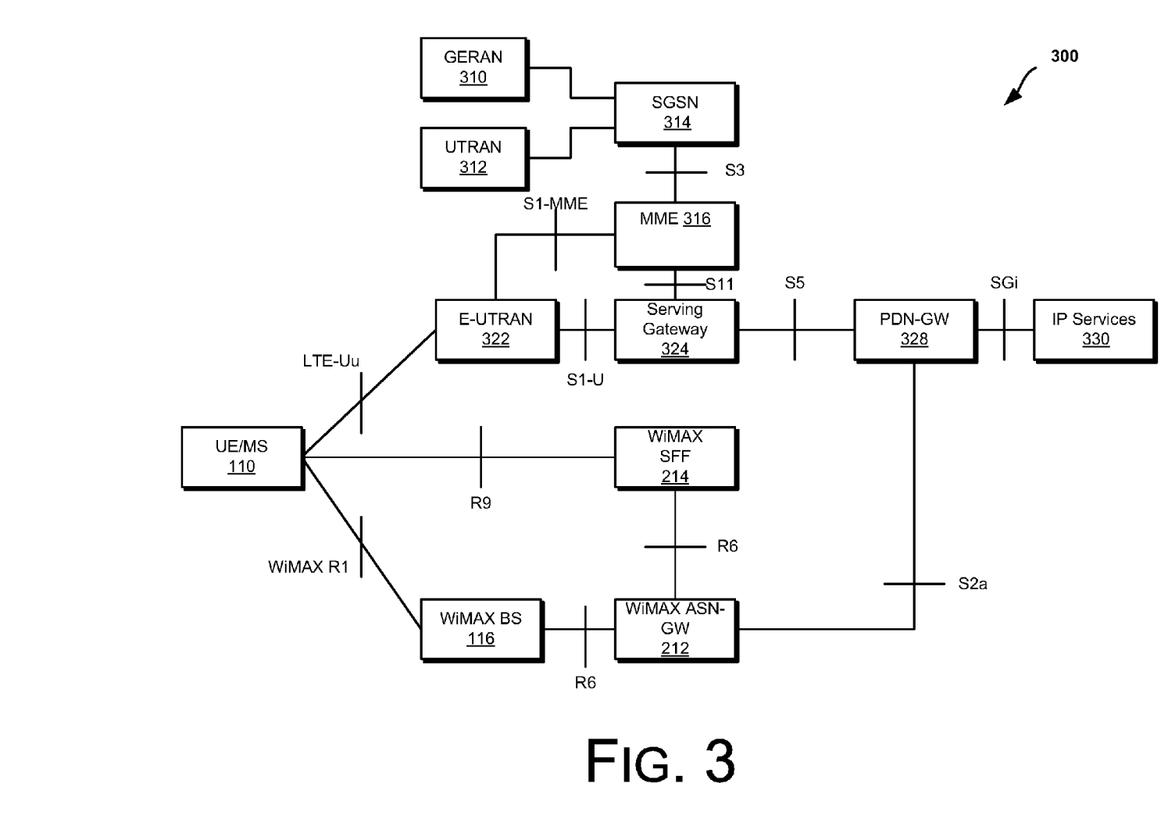
FIG. 3 is a schematic illustration of a wireless network architecture capable of handling a handover between another wireless network in according to some embodiments.

Referring now to FIG. 3, a block diagram of an architecture of a wireless network capable of implementing a handover between another wireless network in accordance with one or more embodiments will be discussed. In one embodiment, FIG. 3 illustrates architectural enhancements of a 3GPP Enhanced Packet Core (EPC) 300. EPC is an architecture evolution of 3GPP systems being standardized as a part of 3GPP Release 8 and beyond. It should be noted that not all of the components of 3GPP EPC 300 are illustrated in FIG. 3 and that FIG. 3 shows the components involved for handover with a WiMAX access network.

In one or more embodiments, a user equipment and/or mobile station 110 couples to an evolved-UTRAN (E-UTRAN) 322 which in turn couples to serving gateway 324. Serving gateway 324 couples to packet data network gateway (PDN Gateway) 328 which is coupled with Internet Protocol Services (IP Services) 330 to allow user equipment and/or mobile station 110 to connect to the internet, although the scope of the claimed subject matter is not limited in this respect.

E-UTRAN 322 couples to a mobility management entity (MME) 316 via an S1-MME interface, and the serving gateway 324 couples to the MME via an S11 interface. MME 316 couples to a Serving GPRS Support Node (SGSN) 314 via an S3 interface. To complete 3GPP network 300, SGSN 314 couples to GSM EDGE Radio Access Network (GERAN) 310 and to UMTS Terrestrial Radio Access Network (UTRAN) 312.

UE/MS 110 may also couple to a WiMAX base station 116 via a WiMAX R1 interface and to a WiMAX SFF 214 via an R9 interface. The WiMAX BS 116 may couple to the WiMAX ASN-GW 212 via an R6 interface. Similarly, the WiMAX SFF 214 may couple to the WiMAX ASN-GW 212 via an R6 interface. The WiMAX ASN-GW 210 may couple to the PDN-GW 328 via an S2a interface.

Figure 4:
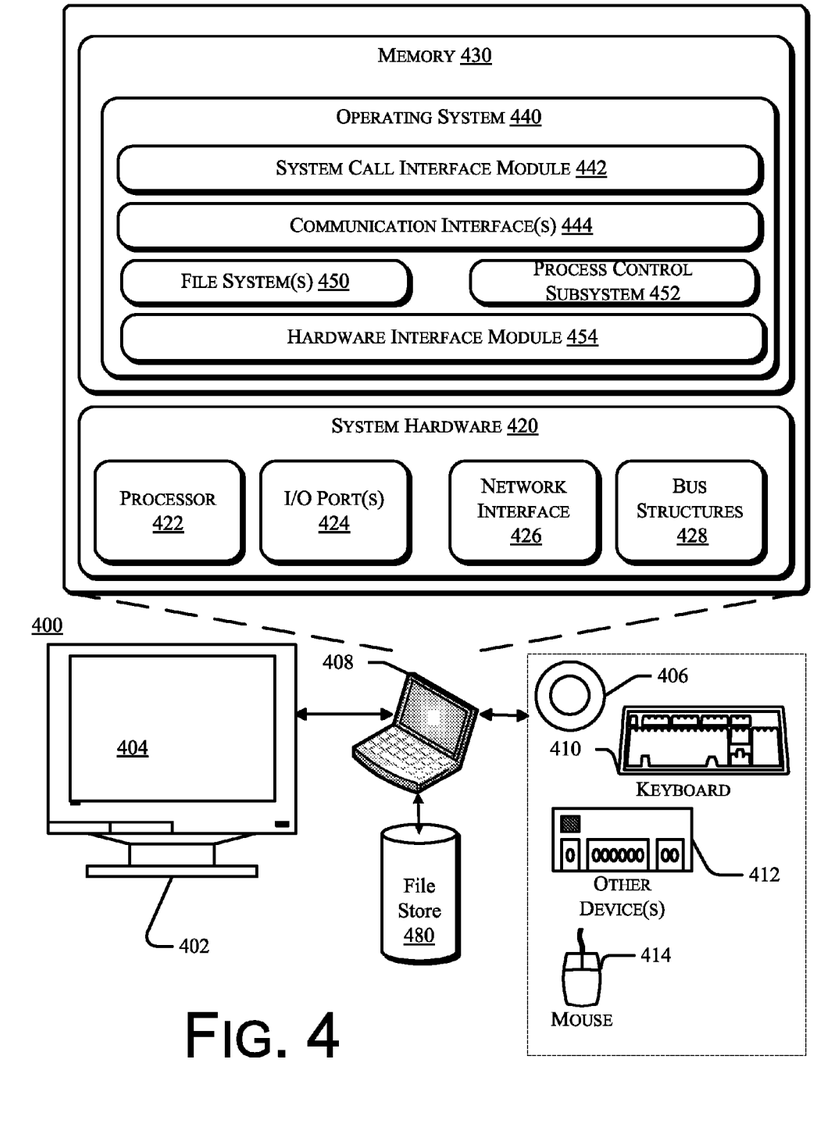
FIG. 4 is a schematic illustration of an electronic device which may be used to implement a network node in a wireless network.

FIG. 4 is a schematic illustration of an electronic device 400 which may be used to implement a network node in a wireless network. By way of example, and not limitation, electronic device 400 may be used to implement the ASN-GW 212 and/or the WiMAX SFF 214. In one embodiment, electronic device 400 may be implemented as a computer-based system that may be coupled to one or more networks.

Referring to FIG. 4, system 400 includes system hardware 420 and memory 430, which may be implemented as random access memory and/or read-only memory. System hardware 420 may include one or more processors 422, input/output ports 424, network interfaces 426, and bus structures 428. In one embodiment, processor 422 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

In one embodiment, network interface 426 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Additional examples of a wireless interface would be a general packet radio service (GPRS) interface, a WiMAX interface, a 3G interface, a WiFi interface, or the like.

Bus structures 428 connect various components of system hardware 128. In one embodiment, bus structures 428 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 430 may include an operating system 440 for managing operations of electronic device 400. In one embodiment, operating system 440 includes a hardware interface module 454 that provides an interface to system hardware 420. In addition, operating system 440 may include a file system 450 that manages files used in the operation of electronic device 400 and a process control subsystem 452 that manages processes executing on computing device 408.

Operating system 440 may include (or manage) one or more communication interfaces 444 that may operate in conjunction with system hardware 420 to transceive data packets and/or data streams from a remote source. Operating system 440 may further include a system call interface module 442 that provides an interface between the operating system 440 and one or more application modules resident in memory 430. Operating system 440 may be embodied as a UNIX operating system or any derivative thereof (e.g., Linux, Solaris, etc.) or as a Windows® brand operating system, or other operating systems.

In various embodiments, the electronic device 400 may be coupled to a computing device 408, e.g., a personal computer, a laptop computer, a personal digital assistant, a mobile telephone, an entertainment device, or another computing device. Electronic device 400 may also be coupled to one or more accompanying input/output devices including a display 402 having a screen 404, one or more speakers 406, a keyboard 410, one or more other I/O device(s) 412, and a mouse 414. The other I/O device(s) 412 may include a touch screen, a voice-activated input device, a track ball, and any other device that allows the computing device 408 to receive input from a user.

A file store 480 may be communicatively coupled to one or more of the electronic device 400 or computing device 408. File store 480 may be an internal device such as, e.g., one or more hard drives, CD-ROM drives, DVD-ROM drives, or other types of storage devices. File store 480 may also be external to computer 108 such as, e.g., one or more external hard drives, network attached storage, or a separate storage network.

Referring back to FIG. 2, in brief overview, in the context of a handover a UE/MS 110 may initiate a preattachment request to begin a handover of the connection of UE/MS 110 from a non-WiMAX access network 118 to a WiMAX ASN 210. The UE/MS 110 is coupled to the WiMAX ASN-GW 212 via the WiMAX SFF 214. In some embodiments the WiMAX SFF 214 may generate a flag which indicates that the preattachment request is being managed by the WiMAX SFF 214. The flag may be implemented in the form of a message attachment, which may be transferred to the ASN-GW 212 via the R6 interface. When the ASN-GW 212 receives a preattachment request from the WiMAX SFF 214 that includes a message attachment which indicates that the preattachment request is being managed by the WiMAX SFF 214, the WiMAX SFF does not release the R6 connection with the WiMAX SFF 214 and does not invoke dynamic host configuration protocol (DHCP) process. This prevents the ASN-GW 212 from severing the connection between the UE/MS 110 and the non-WiMAX access network 118.

In some embodiments the message attachment may be implemented as a TLV attachment for an R6 or R4 interface message as follows:

| | |
|---|---|
| Type | TBD |
| Length in octets | 1 |
| Value | Bitmap. The values are:<br>0x01 = Attached with WiMAX SFF<br>All other values are Reserved. |
| Description | R6_Attachment_Type must be set by WiMAX SFF in MS_PreAttachment_Req message over R6 and by Pre-registered ASN-GW in IM_Exit_State_Change_Rsp over R4 message. All reserved values should be treated as attachment with the BS. |
| Parent TLV(s) | None |

Figure 5:
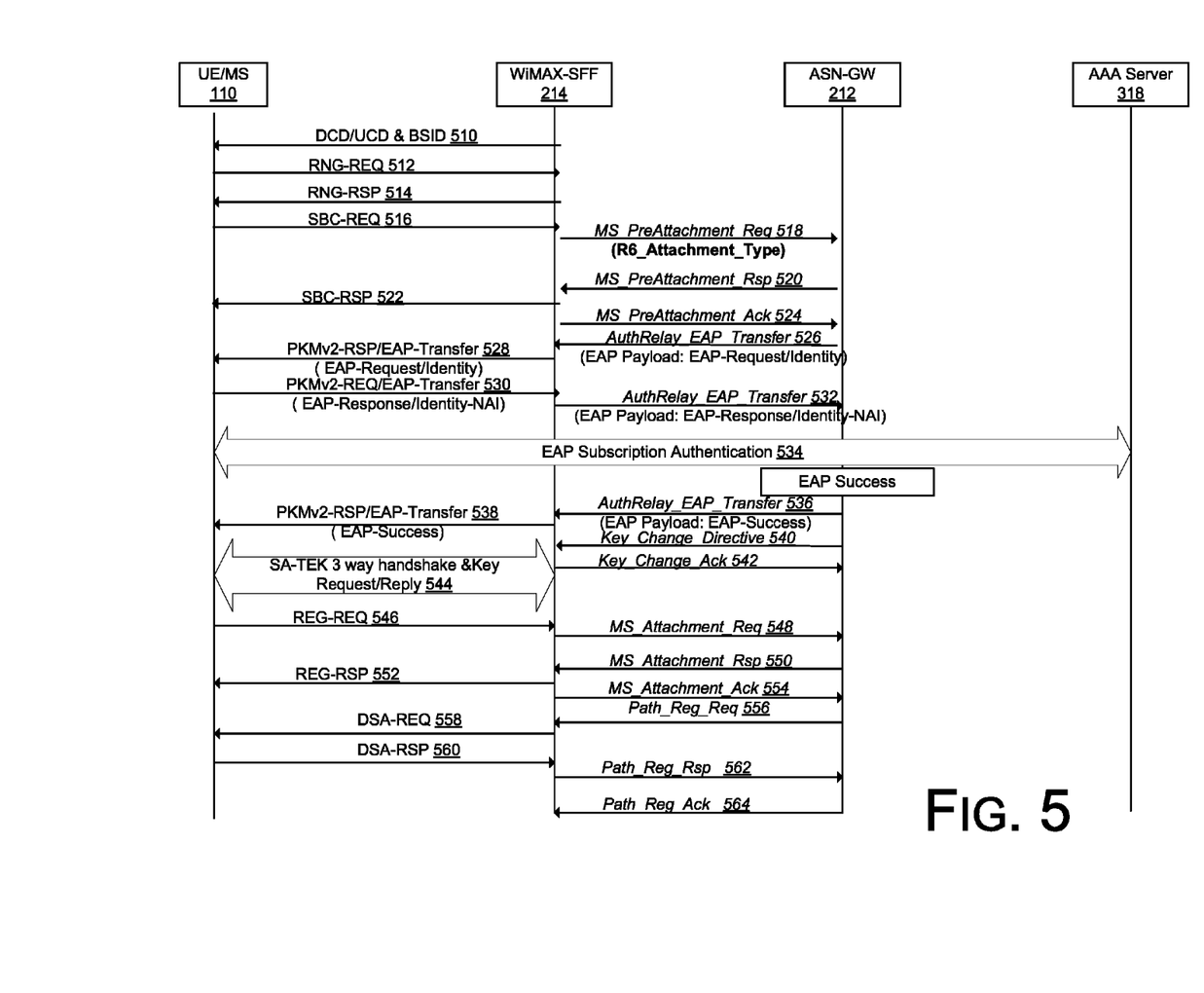
FIGS. 5 and 6 are flow diagrams illustrating operations in a method to initiate a handover process, according to some embodiments.
Figure 6:
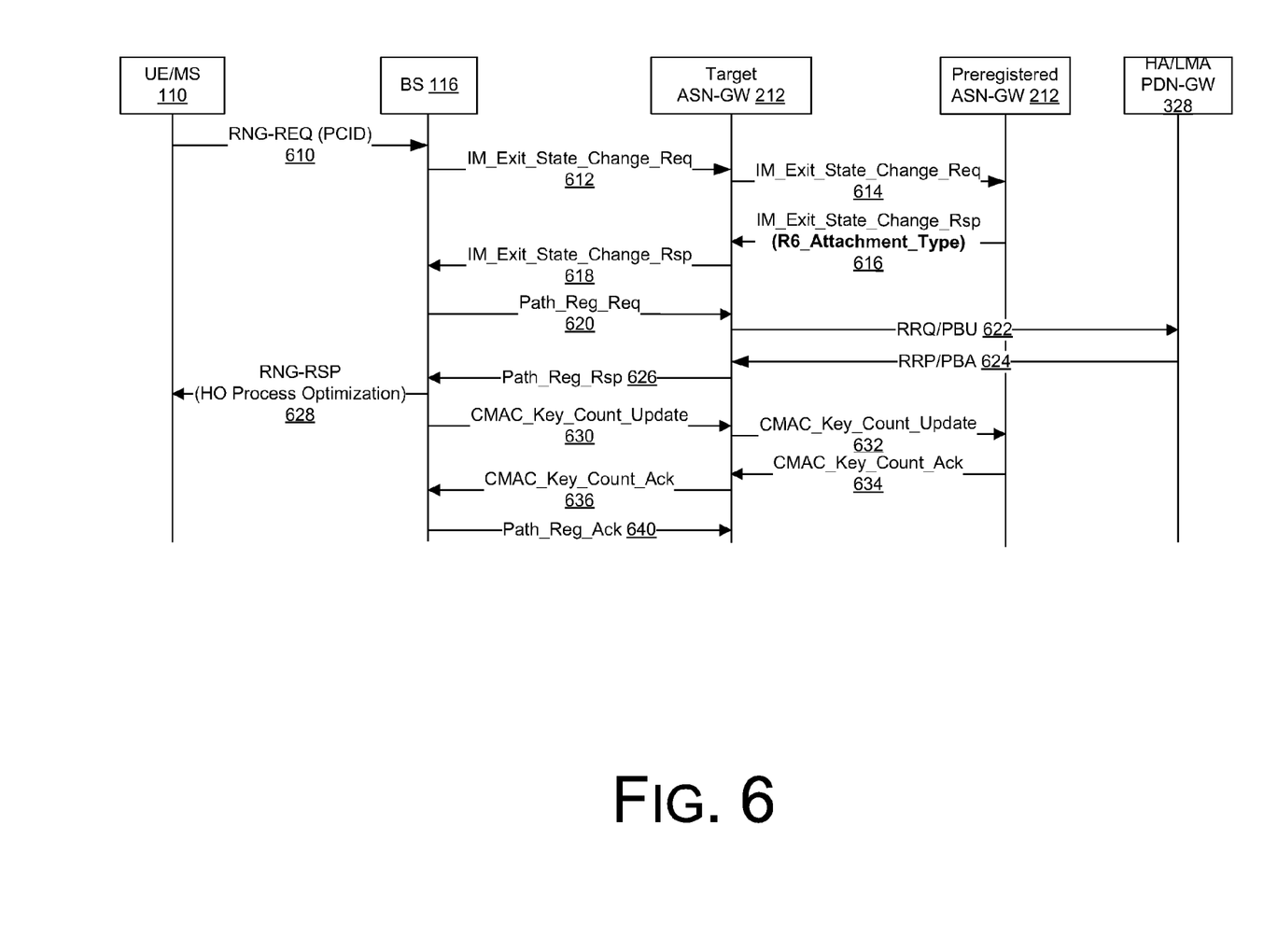

FIGS. 5 and 6 are flow diagrams illustrating operations in a method to initiate a handover process, according to some embodiments. FIG. 5 depicts one embodiment of message flows during a preregistration phase of a handover process is described. Referring to FIG. 5, at operation 510 a WiMAX SFF 214 initiates a DCD/UCD & BSID message to the UE/MS 110, which may be used by the UE/MS for synchronization to a downlink from a target base station.

The UE/MS 110 and a target base station need to conduct handover ranging and capabilities exchanging. Thus, at operation 512 the UE/MS initiates a RNG-REQ message to the WiMAX SFF 214, which responds with a RNG-RSP message (514). At operation 516 the UE/MS 110 initiates a SBC-REQ message to the WiMAX SFF 214.

In response to the SBC-REQ message, at operation 516 the WiMAX SFF 214 initiates a MS_Preattachment_Req message to the ASN-GW 212. In accordance with embodiments described herein, the WiMAX SFF generates a TLV formatted as an R6 attachment type, which is passed to the ASN-GW 212 via an R6 interface (operation 518) as an attachment to a MS_Preattachment_Req message. This indicates ASN-GW that it is attaching with WiMAX SFF 214 and not regular WiMAX BS 116. At operation 520 the ASN-GW 212 transmits a MS_Preattachment_Rsp message back to the WiMAX SFF 214 via the R6 interface. At operation 522 the WiMAX SFF 214 transmits a SBC-RSP message to the UE/MS 110, and at operation 524 the WiMAX SFF 214 transmits a MS_Preattachment_Rsp message to the ASN-GW 212.

Once ranging and capabilities have been handled, an authentication process is initiated. Thus, at operation 526 the ASN-GW 212 transmits an AuthRelay_EAP_Transfer message to the WiMAX SFF 214. The message includes an EAP payload and an EAP-Request/Identity attachment. In response to this message, the WiMAX SFF 214 initiates a PKMv2-RSP/EAP Transfer message to the UE/MS 110. At operation 530 the UE/MS 110 responds with a PKMv2-REQ/EAP-Transfer message. In response, the WiMAX SFF 214 transmits, at operation 532, an AuthRelay_EAP_Transfer message to the ASN-GW 212. The message includes an EAP Payload and an EAP-Response/Identity-NAI attachment.

At operation 534 an EAP Subscription Authentication process is implemented between the UE/MS 110, the WiMAX SFF 214, the ASN-GW 212 and the Authentication Authorization and Accounting (AAA) server 318. When the EAP Subscription Authentication process completes successfully, the ASN-GW 212 transmits an AuthRelay_EAP_Transfer message 536 to the WiMAX SFF 214. The message includes an EAP Payload and an EAP-Success attachment.

At operation 538 the WiMAX SFF 214 transmits an encryption message, a PKMv2-RSP/EAP-Transfer, to the UE/MS 110. The message includes an indicator that the EAP subscription authentication was successful. At operation 540 the ASN-GW 212 transmits a Key_Change-Directive message to the WiMAX SFF 214, which replies with an acknowledgment 542.

At operation 544 the UE/MS 110 and the WiMAX SFF 214 implement a 3-Way Security Association (SA) Traffic Encryption Key (TEK) Handshake 544. When the SA-TEK handshake is successfully completed, the UE/MS 110 sends a registration request (REG-REQ) message 546 to the WiMAX SFF 214. In response to the registration request the WiMAX SFF 214 transmits a MS_Attachment_Req 548 to the ASN-GW 212. The ASN-GW 212 responds with a MS_Attachment_Rsp 550. In response to receiving the MS_Attachment_Rsp, the WiMAX SFF 214 transmits a registration response (REG_RSP) message 552 to the UE/MS 110 and a MS_Attachment_Ack message 554 to the ASN-GW 212.

At operation 556 the ASN-GW 212 transmits a Path_Reg_Req message to the WiMAX SFF 214. In response to this message, the WiMAX SFF transmits a Dynamic Service flow Addition Request (DSA-Req) message 558 to the UE/MS 110, which responds with a Dynamic Service flow Addition Response (DSA-Response) 560.

In response to receiving the DSA-RSP message from the UE/MS 110, the WiMAX SFF 214 transmits a Path_Reg_Rsp message 562 to the ASN-GW 212, which replies with a Path_Reg_Ack 564. This completes the pre-registration phase of the handover process.

FIG. 6 depicts one embodiment of message flows during a handover action phase of a handover process is described. Referring now to FIG. 6, at operation 610 a UE/MS 110 initiates a ranging request (RNG_REQ) to a base station 116. In response to the RNG_REQ the base station 116. At operation 612 the base station 116 transmits an IM_Exit_State_Change_Req message to the target ASN-GW 212, which in turn transmits the IM_Exit_State_Change_Req message to the ASN-GW 212 with which the UE/MS 110 is preregistered. One skilled in the art will recognize that the UE/MS 110 may be preregistered with the target ASN-GW 212 or with a different ASN-GW.

In response to the IM_Exit_State_Change_Req, the ASN-GW 212 with which the UE/MS 110 is preregistered responds with an IM_Exit_State_Change_Rsp message. In accordance with embodiments described herein, the ASN-GW 212 with which the UE/MS is preregistered generates a TLV formatted as an R6 attachment type, which is passed to the target ASN-GW 212 via an R4 interface (operation 616) as an attachment to a IM_Exit_State_Change_Rsp message. At operation 618 the target ASN-GW 212 forwards the IM_Exit_State_Change_Rsp to the BS 116.

At operation 620 the BS 116 transmits a Path_Reg_Req message to the target ASN-GW 212. In response to the message, the target ASN-GW 212 generates a registration request/proxy hinging update (RRQ/PBU) message which is transmitted to the home agent/local management area, which responds with a RRP/PBA response 624. In response, the target ASN-GW 212 transmits a Path_Reg_Rsp message 626 to the BS 116, which in turn issues a RNG-RSP message 628 to the UE/MS 110.

At operation 630 the BS 116 transmits a CMAC_Key_Count_Update message to the target ASN-GW 212, which, at operation 632, forwards the CMAC_Ke_Count_Update to the ASN-GW 212 with which the UE/MS 110 is preregistered. At operation 634 the ASN-GW 212 with which the UE/MS 110 is preregistered sends a CMAC_Key_Count_Ack message to the target ASN-GW 212, which, at operation 636, forwards the CMAC_Key_Count_Ack message to the BS 116. At operation 640 the BS 116 transmits a Path_Reg_Ack message to the target ASN-GW 212.

Thus, in accordance with embodiments as described herein a WiMAX SFF 214 which communicates with an ASN-GW 212 via an R6 interface may generate a TLV which indicates to the WiMAX ASN-GW 212 that it is attached to a WiMAX SFF 214, rather than a base station or the like. The TLV may be transmitted from the WiMAX SFF 214 to the ASN-GW 212 in a message, e.g., a MS_PreAttachment_Req that the SFF generates in response to a registration request from a mobile station 110. The ASN-GW 212 may include additional logic to, response to receiving the TLV, not to wait for DHCP procedure from UE/MS and not invoking Mobile IP (MIP4) or Proxy Mobile IP (PMIP6) procedure towards HA/LMA. Similarly when ASN-GW 212 receives IM_Exit_State_Change_Rsp with R6_Attachment_Type from preregistered ASN-GW 212 over an R4 interface, it includes the additional logic to invoke Mobile IP (MIP4) or Proxy Mobile IP (PMIP6) procedures.

While particular terminology is used herein to describe various components and methods, one skilled in the art will recognize that such terminology is intended to be descriptive and not limiting. By way of example, the term base station is intended to refer to a device which provides access to a network, and the term femto access point is intended to refer to a device which provides access to a lower-level network within the network serviced by the base station. Similarly, the phrase "wireless device" is intended to refer to any type of device which can transmit or receive data on the network. It will be understood that these phrases are intended to apply to multiple different wireless networking standards and to networking standards and configurations not yet described or implemented.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method, comprising:
   receiving, in a WiMAX Signaling forwarding function (SFF) node, a preregistration request for a mobile station;
   in response to the preregistration request, generating a flag to indicate whether the request is being processed by the WiMAX Signaling forwarding function node; and
   forwarding a preattachment request from the WiMAX Signaling forwarding function node to an access gateway, wherein the preattachment request comprises the flag, wherein:
   the access gateway comprises a WiMAX access service network gateway (ASN-GW); and
   the access gateway ASN-GW receives an IM_Exit_State_Change_Rsp with R6_Attachment_Type from a preregistered ASN-GW over an R4 interface and, in response thereto, includes additional logic to invoke a Mobile IP (MIP4) or Proxy Mobile IP (PMIP6) procedures.

2. The method of claim 1, wherein receiving, in a WiMAX Signaling forwarding function node, a preregistration request for a mobile station comprises receiving a preregistration request for a WiMAX access network for a mobile station coupled to a non-WiMAX access network.

3. The method of claim 1, wherein:
   the access gateway comprises a WiMAX access service network gateway (ASN-GW); and
   the flag is embodied as an attachment to a message transmitted between the SFF and the ASN-GW via an R6 interface.

4. The method of claim 3, further comprising receiving, in the SFF, an acknowledgment from the ASN-GW.

5. The method of claim 3, further comprising:
   receiving, in the SFF, an authentication request from the ASN-GW; and
   in response to the authentication request, facilitating an authentication process between the mobile station and a WiMAX Authentication, Authorization and Accounting (AAA) Server.

6. The method of claim 5, further comprising:
   facilitating a handover operation to couple the mobile station to the WiMAX access network.

7. A method, comprising:
   receiving, in a WiMAX access service network gateway (ASN-GW), a preattachment request for a mobile station comprising a flag to indicate whether the request originated from a preregistration node;
   in response to a determination that the flag indicates that the request originated from a preregistration node, maintaining an open interface connection with the preregistration node, wherein:
   the access service network gateway comprises a WiMAX access service network gateway (ASN-GW); and
   the access gateway ASN-GW receives an IM_Exit_State_Change_Rsp with R6_Attachment_Type from a preregistered ASN-GW over an R4 interface and, in response thereto, includes additional logic to invoke a Mobile IP (MIP4) or Proxy Mobile IP (PMIP6) procedures.

8. The method of claim 7, comprising:
   in response to a determination that the flag indicates that the request originated from a preregistration node, not waiting for dynamic host configuration protocol (DHCP) process from the UE/MS and not invoking Mobile IP (MIP4) or Proxy Mobile IP (PMIP6) procedure towards HA/LMA.

9. The method of claim 7, wherein:
   the preregistration node comprises a WiMAX Signaling forwarding function (SFF); and
   the flag is embodied as an attachment to a message transmitted between the SFF and the ASN-GW via an R6 interface.

10. The method of claim 9, comprising transmitting to the SFF, an acknowledgment to the preattachment request.

11. The method of claim 7, further comprising:
    receiving, in the SFF, an authentication request from the ASN-GW; and
    in response to the authentication request, facilitating an authentication process between the mobile station and a WiMAX Authentication, Authorization and Accounting (AAA) Server.

12. The method of claim 7, further comprising:
    facilitating a handover operation to couple the mobile station to the WiMAX access network.

13. A method, comprising:
    receiving, in an access gateway, a preregistration request for a WiMAX access network for a mobile station coupled to a non-WiMAX access network; and
    in response to the preregistration request, allowing the mobile station to remain connected to the non-WiMAX access network, wherein:
    the access gateway comprises a WiMAX access service network gateway (ASN-GW); and
    the access gateway ASN-GW receives an IM_Exit_State_Change_Rsp with R6_Attachment_Type from a preregistered ASN-GW over an R4 interface and, in response thereto, includes additional logic to invoke a Mobile IP (MIP4) or Proxy Mobile IP (PMIP6) procedures.

14. The method of claim 13, wherein receiving a preregistration request for a WiMAX access network for a mobile station coupled to a non-WiMAX access network comprises receiving a preregistration request in a WiMAX SFF via a R9 interface.

15. The method of claim 14, further comprising:
    in response to the preregistration request, generating a TLV which indicates that the request is being processed by the WiMAX Signaling forwarding function node; and forwarding a preattachment request from the WiMAX Signaling forwarding function node to an access gateway, wherein the preattachment request comprises the attachment flag TLV.

16. The method of claim 13, wherein allowing the mobile station to remain connected to the non-WiMAX access network comprises at least one of maintaining an open interface connection between a WiMAX SFF node and not waiting for dynamic host configuration protocol (DHCP) process from the UE/MS and not invoking Mobile IP (MIP4) or Proxy Mobile IP (PMIP6) procedure towards HA/LMA.

17. The method of claim 13, further comprising:
receiving an authentication request from the ASN-GW; and
in response to the authentication request, facilitating an authentication process between the mobile station and a WiMAX Authentication, Authorization and Accounting (AAA) Server.

* * * * *